United States Patent
Kearby et al.

(10) Patent No.: US 8,010,366 B1
(45) Date of Patent: Aug. 30, 2011

(54) PERSONAL HEARING SUITE

(75) Inventors: Gerald W. Kearby, Loma Mar, CA (US); Earl I. Levine, Palo Alto, CA (US); A. Robert Modeste, Redwood City, CA (US)

(73) Assignee: NeuroTone, Inc., Redwood City, CA (US)

( * ) Notice: Subject to any disclaimer, the term of this patent is extended or adjusted under 35 U.S.C. 154(b) by 808 days.

(21) Appl. No.: 11/688,861

(22) Filed: Mar. 20, 2007

(51) Int. Cl.
*G10L 21/06* (2006.01)

(52) U.S. Cl. ....................................................... 704/271

(58) Field of Classification Search .................... 704/271
See application file for complete search history.

(56) References Cited

U.S. PATENT DOCUMENTS

| | | | | |
|---|---|---|---|---|
| 5,781,886 A * | 7/1998 | Tsujiuchi | ...................... | 704/275 |
| 6,234,979 B1 * | 5/2001 | Merzenich | ...................... | 600/559 |
| 6,507,736 B1 * | 1/2003 | Lee et al. | ................... | 455/422.1 |
| 6,845,321 B1 * | 1/2005 | Kerns | ............................. | 701/209 |
| 7,167,822 B2 * | 1/2007 | Ueda | ................................ | 704/7 |
| 7,647,166 B1 * | 1/2010 | Kerns | ........................... | 701/207 |

\* cited by examiner

*Primary Examiner* — Susan McFadden
(74) *Attorney, Agent, or Firm* — James D. Ivey

(57) ABSTRACT

A hearing application suite includes enhancement and training for listening and hearing of prerecorded speech, extemporaneous voice communication, and non-speech sound. Enhancement includes modification of audio according to audiometric data representing subjective hearing abilities of the user, display of textual captions contemporaneously with the display of the audiovisual content, user-initiated repeating of a most recently played portion of the audiovisual content, user-controlled adjustment of the rate of playback of the audiovisual content, user-controlled dynamic range compression/expansion, and user controlled noise reduction. Training includes testing the user's ability to discern speech and/or various other qualities of audio with varying degrees of quality.

9 Claims, 6 Drawing Sheets

PERSONAL HEARING SUITE

BACKGROUND OF THE INVENTION

1. Field of the Invention

The present invention relates generally to computer-implemented hearing assistance and, more particularly, to a system for aiding information access within a computer for hearing impaired persons.

2. Description of the Related Art

Copious amounts of information are available through the Internet and through various connected devices. Much of this information is formulated for mass consumption. People who deviate from the mass population in significant ways find access to this sea of information to be somewhat limited. Hearing impaired people are such people, finding that much of the audiovisual content and voice communication to be challenging.

What is needed is assistance to hearing impaired people for access to the world's information.

BRIEF SUMMARY OF THE INVENTION

In accordance with the present invention, a hearing application suite includes enhancement and training for listening and hearing of prerecorded speech, extemporaneous voice communication, and non-speech sound. To enhance the user's hearing of speech, i.e., a narrative component of audiovisual content, the hearing application suite modifies the audio portion of the audiovisual content according to audiometric data representing subjective hearing abilities of the user. Enhancement of speech also includes display of textual captions contemporaneously with the display of the audiovisual content, user-initiated repeating of a most recently played portion of the audiovisual content, user-controlled adjustment of the rate of playback of the audiovisual content, user-controlled dynamic range compression/expansion, and user controlled noise reduction.

To enhance the user's hearing of extemporaneous voice communication, e.g., telephone communication, the hearing application suite performs real-time modification of received audio according to audiometric data representing subjective hearing abilities of the user. Enhancement of extemporaneous voice communication also includes display of textual captions contemporaneously with receipt of the audio through the telephone communication, user-initiated repeating of a most recently played portion of the received audio, user-controlled adjustment of the rate of playback of the received audio, user-controlled dynamic range compression/expansion, and user controlled noise reduction. Repeating of the most recently played portion of the received audio presents a delay in the response of the user to the speaker on the other end of the telephone communication. Accordingly, negative impact on the spontaneity of the telephone communication is minimized by (i) speeding up playback of received audio cached during the repeated playback and/or (ii) sending a voice message requesting the other speaker's patience.

To enhance the user's hearing of non-narrative sound, i.e., audiovisual content in which narrative speech is not paramount, the hearing application suite modifies the audio portion of the audiovisual content according to audiometric data representing subjective hearing abilities of the user. Enhancement of non-narrative sound also includes user-controlled adjustment of the rate of playback of the audiovisual content, user-controlled dynamic range compression/expansion, and user controlled noise reduction.

The hearing application suite allows the user to store a number of profiles for narrative listening, telephone communications, and non-narrative listening.

The hearing application suite can be implemented in a server computer system, making enhancement of listening to audiovisual content through the Internet an integral part of the browsing experience of a hearing-impaired user. Similar advantages are achieved by providing plug-in modules and helper applications from the hearing application suite to adapt client-side browsing applications for the specific hearing abilities of the hearing-impaired user.

Training in speech listening by the hearing application suite includes testing the user's ability to discern speech in varying degrees of sound quality. Training in discerning speech in telephone communications by the hearing application suite includes testing the user's ability to discern speech in varying degrees of sound quality in which sound quality is degraded with the types of sound degradation typically found in telephone communications. Added noise simulates channel errors, dropouts, decompression errors, and echoes often experienced in mobile telephone communications. Similar errors in other types of telephone communications are simulated to train the user to better understand speech that include those sort of errors as well.

Training in other sound listening by the hearing application suite includes testing the user's ability to discern various qualities of such other sounds with varying degrees of quality. For example, the user is asked to identify a particular type of instrument creating a sample musical piece, to identify the next phrase in a repeating melody, and/or to identify a presumably easily recognizable piece of music.

DETAILED DESCRIPTION

In accordance with the present invention, hearing application suite 220 (FIG. 2) assistance and training to a hearing impaired user in accessing various types of information available through computer networks today.

Figure 1:
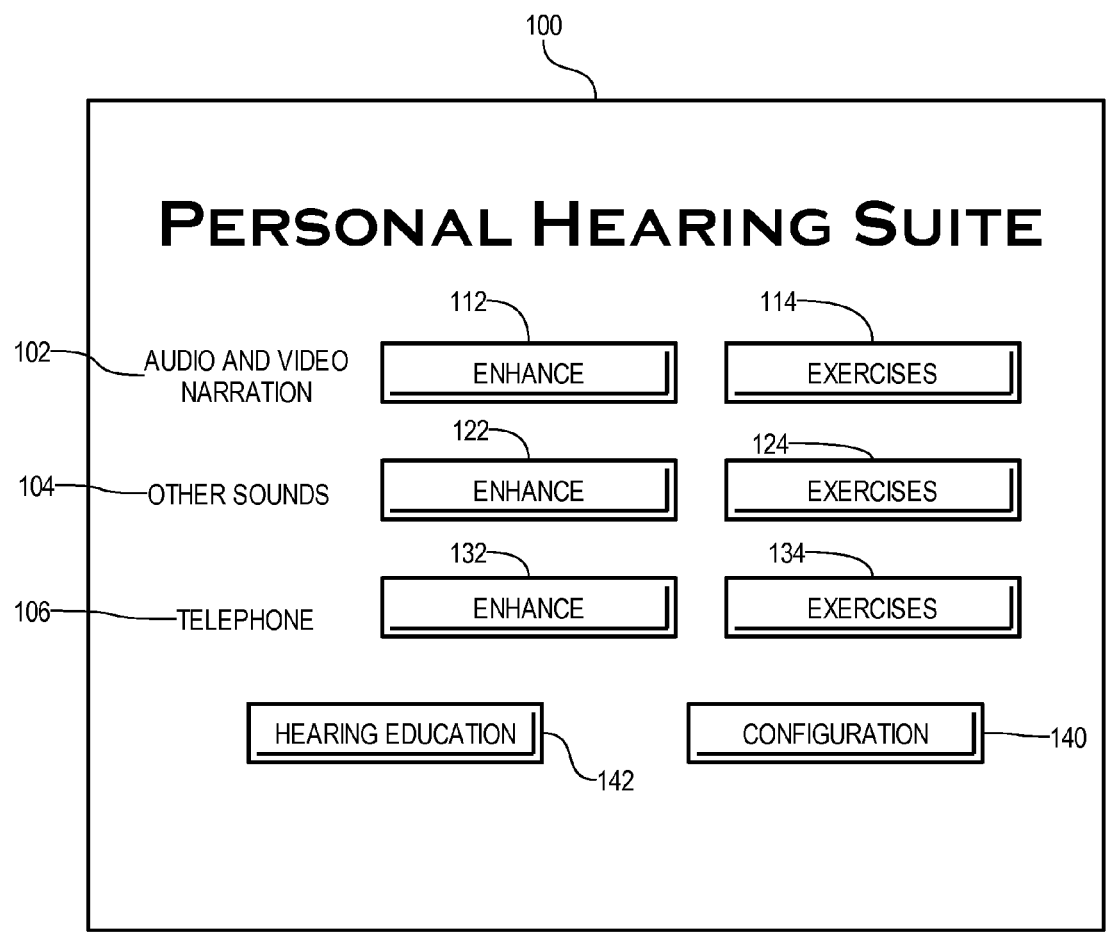
FIG. 1 is a screen view of a user's experience with a hearing application suite in accordance with the present invention.
Figure 2:
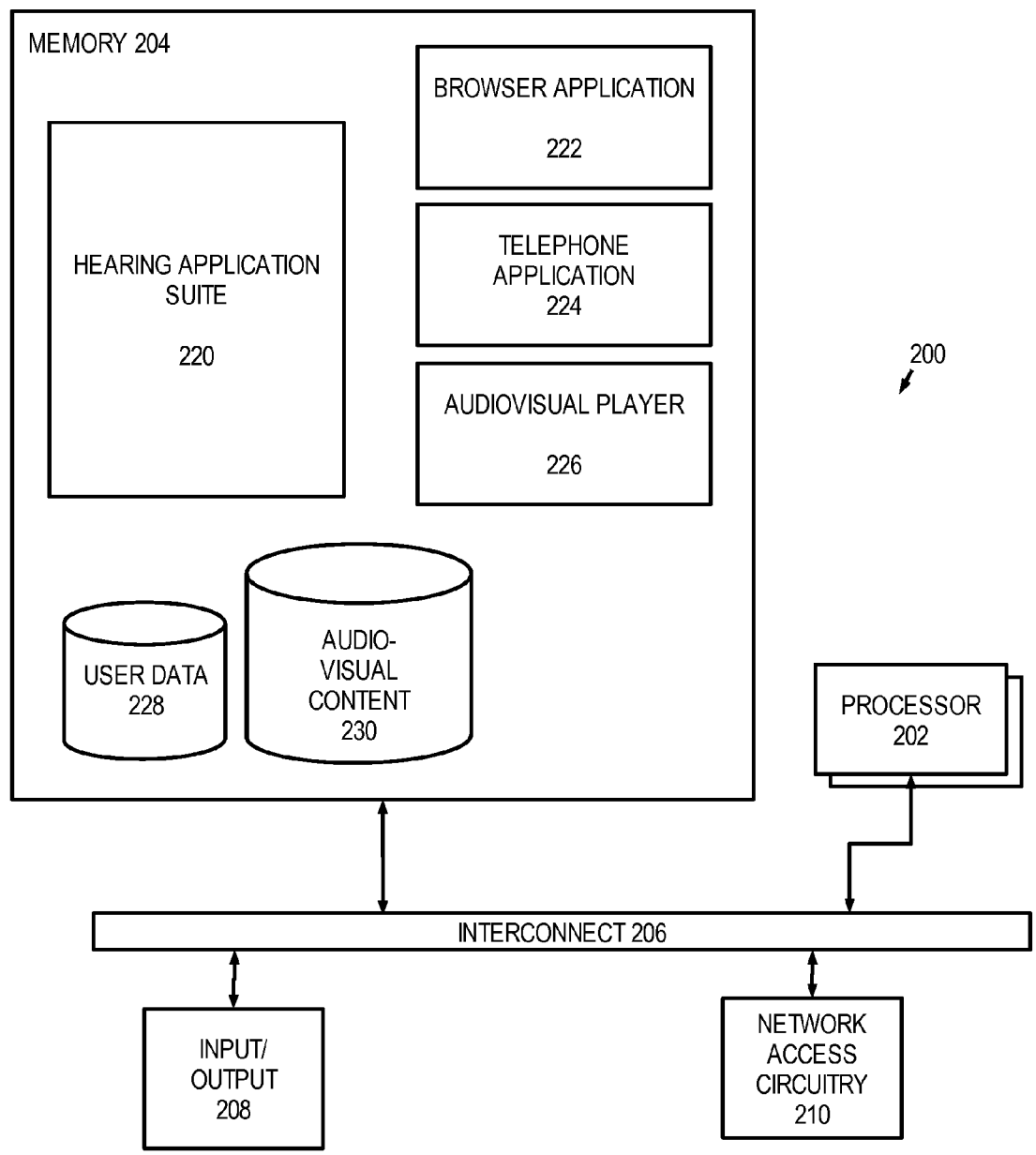
FIG. 2 is a block diagram showing some of the elements of a computer within which the hearing application suite providing the screen view of FIG. 1.

Screen view 100 (FIG. 1) illustrates a user's experience provided by hearing application suite 220 (FIG. 2). The types of information available through a computer network are categorized as audio and/or video narration 102, other sounds 104, and telephone communication 106.

Narration 102 includes generally any audio and/or video content that includes human speech wherein the substantive content of the human speech is of primary concern to the user. Examples include "talking head" shows such as news broadcasts that can be streamed through a computer network.

Other sounds 104 includes generally any other audio and/or video content. Examples include music, music videos, non-speech recordings (e.g., bird calls). Although music often includes human speech in the form of vocals and lyrics, music and music videos in the other sounds 104 category can include such music and music videos wherein the sonic quality, rather than the substantive content, of the vocals is the user's priority. The user can determine and communicate whether the substantive content of speech is paramount by selecting from the buttons of screen view 100 associated with narration 102 or with other sounds 104.

Telephone communications 106 includes interactive, real-time human speech in which the substantive content is of primary importance to the user.

Within each category, the user can select assistance or training using any of a number of graphical user interface (GUI) buttons. For example, enhance button 112 and exercises button 114 cause hearing application suite 220 (FIG. 2) to respectively assist and train the user in perception of narration 102. As described more completely below, such assistance can include such things as equalization of the sound customized for the user, captioning, noise reduction, repeat function, and exporting of enhanced content. Similarly, training includes the type of training described in co-pending U.S. patent application Ser. No. 11/151,820 filed Jun. 13, 2005 by Gerald W. Kearby, Earl I. Levine, A. Robert Modeste, Douglas J. Dayson, and Jamie MacBeth for "Aural Rehabilitation System and a Method of Using the Same" (Publication No. 2006/0029912—sometimes referred to herein as "the '820 Application"), the teachings of which are incorporated herein by reference. As described in greater detail below, such training can involve various degrees of sound degradation and of adding synthesized noise to mimic noise associated with AM radio, FM radio, and over-the-air broadcast television signals.

Similarly, enhance button 122 (FIG. 1) and exercises button 124 cause hearing application suite 220 (FIG. 2) to respectively assist and train the user in perception of other sounds 104. Such assistance can include such things as equalization of the sound customized for the user, noise reduction, and exporting of enhanced content. Similarly, training includes the type of training described in the '820 Application, and such training can involve various degrees of sound degradation and of adding synthesized noise to mimic noise associated with AM radio, FM radio, and over-the-air broadcast television signals.

In addition, enhance button 132 (FIG. 1) and exercises button 134 cause hearing application suite 220 (FIG. 2) to respectively assist and train the user in perception of telephone communication 106. Such assistance can include such things as equalization of the sound customized for the user, captioning, noise reduction, repeat function, and exporting of enhanced content. Similarly, training includes the type of training described in the '820 Application, and such training can involve various degrees of sound degradation and of adding synthesized noise to mimic noise associated with telephone and two-way radio communications. In addition, mobile telephone communication involves channel errors, dropouts, decompression errors, echo, and other degradation of voice signals beyond mere noise. Emulation of these forms of voice signal degradation are used by training to improve the user's ability to hear through such signal degradation in actual mobile telephone communication.

A configuration button 140 allows the user to customize the behavior of hearing application suite 220 (FIG. 2) to the preferences of the user in a manner described more completely below.

A hearing education button 142 initiates browsing of browsable information pertaining to hearing health, causes and treatment of hearing impairment, and links to other related information. Such information can be audio, video, interactive exercises, and detailed instructions regarding healthy ways to set volume controls on portable audio/video devices.

Some elements of a computer 200 (FIG. 2), within which hearing application suite 220 executes, are shown in diagrammatic form. Computer 200 includes one or more microprocessors 202 that retrieve data and/or instructions from memory 204 and execute retrieved instructions in a conventional manner. Memory 204 can include persistent memory such as magnetic and/or optical disks, ROM, and PROM and volatile memory such as RAM.

Microprocessors 202 and memory 204 are connected to one another through an interconnect 206 which is a bus in this illustrative embodiment. Interconnect 206 is also connected to one or more input and/or output devices 208 and network access circuitry 210. Input/output devices 208 can include, for example, a keyboard, a keypad, a touch-sensitive screen, a mouse, a microphone as input devices and can include a display—such as a liquid crystal display (LCD)—and one or more loudspeakers as output devices. Network access circuitry 210 sends and receives voice signals and/or data through a computer network such as a local area network (LAN) or the Internet, for example.

Hearing application suite 220 is all or part of one or more computer processes executing within computer 200. Similarly, a browser application 222, a telephone application 224, and an audiovisual player 226 are each all or part of one or more computer processes executing within computer 200.

Browser application 222 is a conventional information browser such as the Firefox browser available from the Mozilla Foundation and enables browsing of data stored within memory 204 and/or data available through a computer network.

Telephone application 224 is a conventional virtual telephone through which the user can engage in voice communications through a computer network. Examples of such a virtual telephone include the Skype virtual telephone and instant messaging program available from Skype Limited, Yahoo! Messenger available from Yahoo! Inc., Google Talk available from Google, and FWD.Communicator available from FreeWorldDialup, LLC.

Audiovisual player 226 is a conventional audiovisual player for playing audiovisual content stored within memory 204 or available through a computer network. Examples of audiovisual player 226 include the mplayer audiovisual player available from Mplayer.org, Windows Media Player available from Microsoft Corporation, and the RealPlayer® audiovisual player available from Real Networks.

User data 228 includes data specific to the hearing impaired user of computer 200, include audiometry data and user preferences. Such audiometry data includes data representing the specific hearing abilities of the user through assessment of the user's hearing abilities in a manner described more completely in the '820 Application, and that description is incorporated herein by reference. Audiovisual content 230 includes audio data and video data store within memory 204.

Figure 3:
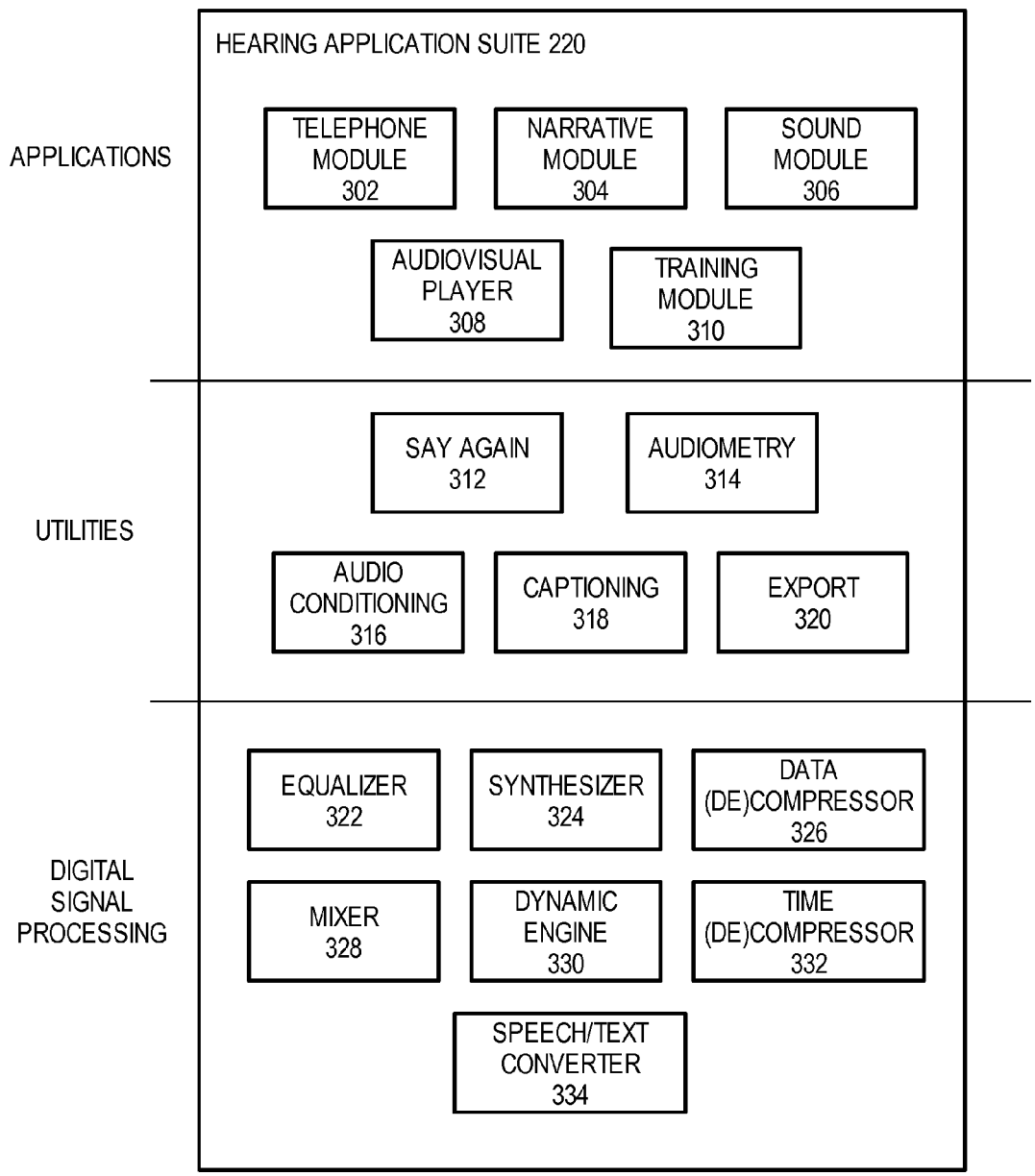
FIG. 3 is a block flow diagram showing various component modules of the hearing application suite in accordance with the present invention.

Hearing application suite 220 is shown in greater detail in FIG. 3 and includes a number of logic modules that can be classified as applications, utilities, or digital signal processing (DSP) modules. A telephone module 302 implements telephone communications 106 (FIG. 1). A narrative module 304

(FIG. 3) implements narration 102 (FIG. 1). A sound module 306 (FIG. 3) implements other sounds 104 (FIG. 1).

An audiovisual player 308 (FIG. 3) implements enhanced listening represented by buttons 112 (FIG. 1), 122, and 132. A training module 310 (FIG. 3) implements exercises represented by buttons 114 (FIG. 1), 124, and 134.

Figure 4:
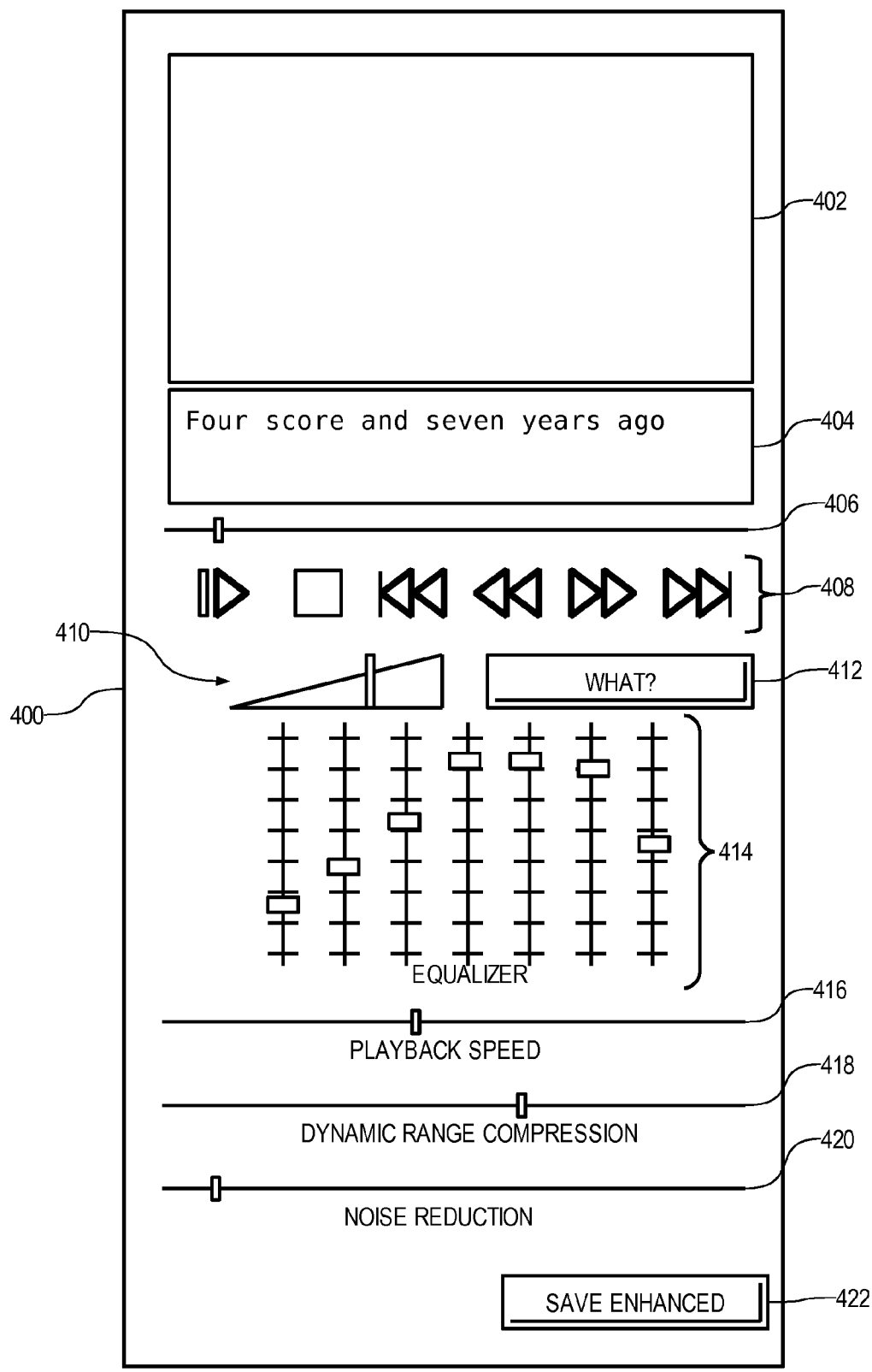
FIG. 4 shows a window that includes user interface elements for enhanced playback of narrative audiovisual content.

When the user actuates enhance button 112 (FIG. 1), narrative module 304 (FIG. 3) of hearing application suite 220 uses audiovisual player 308 to implement an interactive audiovisual viewing experience that is represented by a window 400 (FIG. 4). Window 400 is displayed in a window manager. Window managers are well-known components of many operating systems currently available and are not described further herein.

It should also be appreciated that all or part of hearing application suite 220 can be implemented in a server computer system accessible to computer 200 (FIG. 2) through the Internet or another computer network. In this alternative embodiment, window 400 can be created and controlled by one or more modules of hearing application suite 220 (FIG. 3) implemented in the server computer and window 400 can be wholly or partly implemented by an applet that executes within browser application 222 (FIG. 2) of computer 200 as a thin client. In the embodiment in which all or part of hearing application suite 220 is implemented in a server computer system, all or part of user data 228 and all or part of audiovisual content 230 can be stored in the server computer system or in other computer systems accessible through the Internet or other computer network.

Within window 400, narrative module 304 (FIG. 3) causes an audiovisual player 308 to play audiovisual content for display in a playback window 402. A data compressor/decompressor 326 includes a number of codecs for retrieving and/or storing of audiovisual content in any of a number of standard formats. The audiovisual content can be selected by the user from audiovisual content 230 (FIG. 2) or from content available through a computer network using conventional file browsing techniques. The particular audiovisual content played in playback window 402 is sometimes referred to as the subject audiovisual content. The GUI for the file browsing can be implemented within audiovisual player 308. In addition, associations with file types in the operating system of computer 200 can automatically invoke audiovisual player 308 upon the user's request that a given file of audiovisual content be opened. The result is that hearing application suite 220 can be used for all audio playback within computer 200, making the audiovisual experience of computer use today more accessible to hearing-impaired users. Similarly, all or part of hearing application suite 220 can act as a helper application or can be implemented as a plug-in to assist browser application 222 in presenting a user interface and narration enhancement as described herein.

A captioning module 318 produces a textual caption for display by audiovisual player 308 in a caption window 404 (FIG. 4). If a synchronized textual caption is included in the subject audiovisual content, captioning module 318 extracts the textual caption and provides the textual caption—along within synchronization information—to audiovisual player 308 for display in caption window 404. Audiovisual player 308 synchronizes display of the textual capture with playback of the subject audiovisual content in playback window 402.

If no synchronized textual caption is included in the subject audiovisual content, captioning module 318 (FIG. 3) uses a speech/text converter 334 to form a textual representation of speech included in the subject audiovisual content. Speech-to-text conversion and speech/text converter 334 are conventional and known and are not described in greater detail herein. In this illustrative embodiment, speech/text converter 334 uses the Sphinx speech recognition engine available from the Carnegie Mellon University Sphinx Group. Captioning module 318 maintains information regarding time offsets into the subject audiovisual content as the subject audiovisual content streams from captioning module 318 such that display of the resulting text from speech/text converter 334 can be synchronized with playback of the subject audiovisual content.

In this illustrative embodiment, hearing application suite 220 caches captions of the subject audiovisual content for subsequent use. In embodiments of hearing application suite 220 implemented in a server computer system, such cached captioning data can be used repeatedly for many requests of the same audiovisual content, leveraging speech recognition to assist many hearing-impaired users. In addition, the captioning data can then become searchable such that much of the world's narrated audiovisual content that is available through the Internet is easily searchable by the substantive content of the narration.

In addition, some non-synchronized captioning data might be available for the subject audiovisual content. Many audiovisual content has associated transcripts available. Such transcripts can be associated by the author of the transcripts are easily matched to corresponding audiovisual content. Other transcripts can be found by searching the Internet for closely matching text to that produced by speech/text converter 334. In either case, transcripts often deviate from the actual language of the speech content of audiovisual content. Accordingly, captioning module 318 stores data representing differences between the transcript of the subject audiovisual content and the captioning data derived from the audiovisual content itself by speech/text converter 334. In this illustrative embodiment, captioning module 318 also includes in the captioning data synchronization data matching portions of the transcript with temporal offsets into the subject audiovisual content. During playback of the subject audiovisual content for which a transcript and accompanying captioning data are available, captioning module 318 derives accurate and complete captions for display in caption window 404 by applying the differences of the captioning data to the transcript to form a corrected transcript and synchronizing display of the corrected transcript with playback of the subject audiovisual content.

It is helpful to consider the following example as an illustration. Suppose a transcript represents that the speak uttered, "the thing I'd like to emphasize is this." Suppose further that speech/text converter 322 determined that what was actually spoken was, "the . . . uh, the . . . the thing I'd like to emphasize is . . . well, this." Captioning module 322 would store that "the" in the transcript should be replaced with "the . . . uh, the . . . the" and that "is this" should be replaced with "is . . . well, this." In addition, the captioning data would reflect that the statement quoted above appears at 00:01:33.32 from the start of playback of the subject audiovisual content. During playback of the subject audiovisual content, captioning module 318 retrieves the transcript and the stored captioning data and implements the changes to correct the transcript and displays the above phrase in caption window 404 at about 00:01:33.32 from the start of playback of the subject audiovisual content.

The use of speech/text converter 334 to provide captions in caption window 404 dramatically enhances comprehension of speech within the audiovisual content by a hearing-impaired user. The inclusion of captions with audiovisual content received through network access circuitry 210, e.g., through the Internet, makes the universe of audiovisual content available through the Internet much more accessible to hearing-impaired people.

Slider 406 (FIG. 4) allows the user to cause playback of the subject audiovisual content by audiovisual player 308 to jump to any place within the subject audiovisual content in a conventional manner. Controls 408 allow the user to cause audiovisual player 308 to play, pause, stop, jump back, rewind, fast forward, and jump ahead in the playback of the subject audiovisual content in a conventional manner. Slider 410 allows the user to control the volume of the audio portion of the subject audiovisual content as played by audiovisual player 308 in a conventional manner.

Actuation of a repeat button 412 by the user invokes processing by say again module 312 (FIG. 3). Say again module 312 causes repeat playback of the most recently played portion of the subject audiovisual content. The amount of the most recently played portion is generally a few seconds, e.g., three (3) seconds. Repeated actuation of repeat button 412 causes say again module 312 to playback the repeated portion of the subject audiovisual content at a reduced rate, using time compressor/decompressor 332 to slow the playback of the subject audiovisual content, at least the repeated portion thereof. In this illustrative embodiment, time compressor/decompressor 332 is the SoundTouch sound processing library by Olli Parviainen and available at <http://www.surina.net/soundtouch/>.

An equalizer interface 414 allows the user to customize gain of the audio portion of the subject audiovisual content as processed by an equalizer module 322 (FIG. 3). Initially, audiovisual player 308 sets the respective bands of equalizer module 322 according to the specific hearing abilities of the user as represented in user data 222 (FIG. 2). The result is that equalizer module 322 (FIG. 3) adjusts respective frequency bands of the audio portion such that its playback should sound to the user as intended by the creator of the subject audiovisual content. Thereafter, the user is free to adjust the gain of any of the frequency bands represented in equalizer interface 414 (FIG. 4) to accommodate the subjective, personal preference of the user. In some embodiments, audiovisual player 308 provides a user interface whereby the user can reset equalizer module 322, and therefore equalizer interface 414, to a default setting based on the subjective hearing abilities of the user as represented in user data 222.

A slider 416 (FIG. 4) allows the user to control the rate at which the subject audiovisual content is played back by audiovisual player 308 (FIG. 3). In accordance with the user's indication of a desired playback speed by use of slider 416, audio conditioning module 316 uses time compressor/decompressor 326 to adjust the rate of playback of the subject audiovisual content. Since, in video with sound, the video and sound portions are synchronized, audiovisual player 308 is capable of adjusting playback rates of the video portion to match the playback rate of the sound portion. Video frame rate adjustment can be achieved by reducing the frequency of display of subsequent frames to slow playback of the video portion and by frame dropping to accelerate playback of the video portion.

A slider 418 (FIG. 4) allows the user to control audio dynamic range compression to compress or expand the dynamic range of the audio portion of the subject audiovisual content. Audio conditioning module 316 uses dynamic engine 330 to expand and/or compress the dynamic range of the audio portion of the subject audiovisual content. In this illustrative embodiment, dynamic engine 330 uses an enveloper follower in conjunction with audio level compression, both of which are known and are not described further herein.

A slider 420 (FIG. 4) allows the user to control a degree of noise reduction processing to be applied to the audio portion of the subject audiovisual content. Audio conditioning module 316 causes synthesizer 324 to apply noise reduction filtering to the audio portion of the subject audiovisual content. In this illustrative embodiment, synthesizer 324 applies filters that are specifically tuned to the types of noise typically found in digitized audiovisual content and to the types of noise typically observed in over-air reception of audiovisual content. With slider 420 (FIG. 4), the user can increase the aggression which with noise reduction is applied to a point at which the speech is intelligible to the user and not beyond so as to avoid overly aggressive noise filtering and to preserve as much of the original qualities of the audio portion of the subject audiovisual content.

A save profile button 422 allows the user to cause narrative module 304 to save the various settings represented in window 400 into user data 222. The various settings can include, for example, the gain represented by slider 410, the respective gains of various frequency bands represented by equalizer interface 414, the playback speed represented by slider 416, the degree of spectrum compression represented by slider 418, and the degree of noise reduction represented by slider 420. In addition, narrative module 304 allows the user to save different sets of settings within user data 222 as distinct profiles. For example, the user may save distinct collections of settings for over-air received audiovisual content, high-quality audiovisual content, and heavily-compressed audiovisual content that might be received through the Internet at moderate bandwidths.

In addition, save profile button 422 allows the user to save a persistent copy of the subject audiovisual content as enhanced for the user, including captions displayed in captioning window 404. In some embodiments, the subject audiovisual content is saved with captioning data represent within a subtitle track of the saved audiovisual content. In other embodiments, the captioning data is incorporated into the video content of the saved audiovisual content as superimposed subtitles.

Thus, when invoked by narrative module 304 (FIG. 3), audiovisual player 308 provides tools to allow hearing-impaired users to significantly enhance their listening experience of audiovisual content accessible through computer 200.

Figure 5:
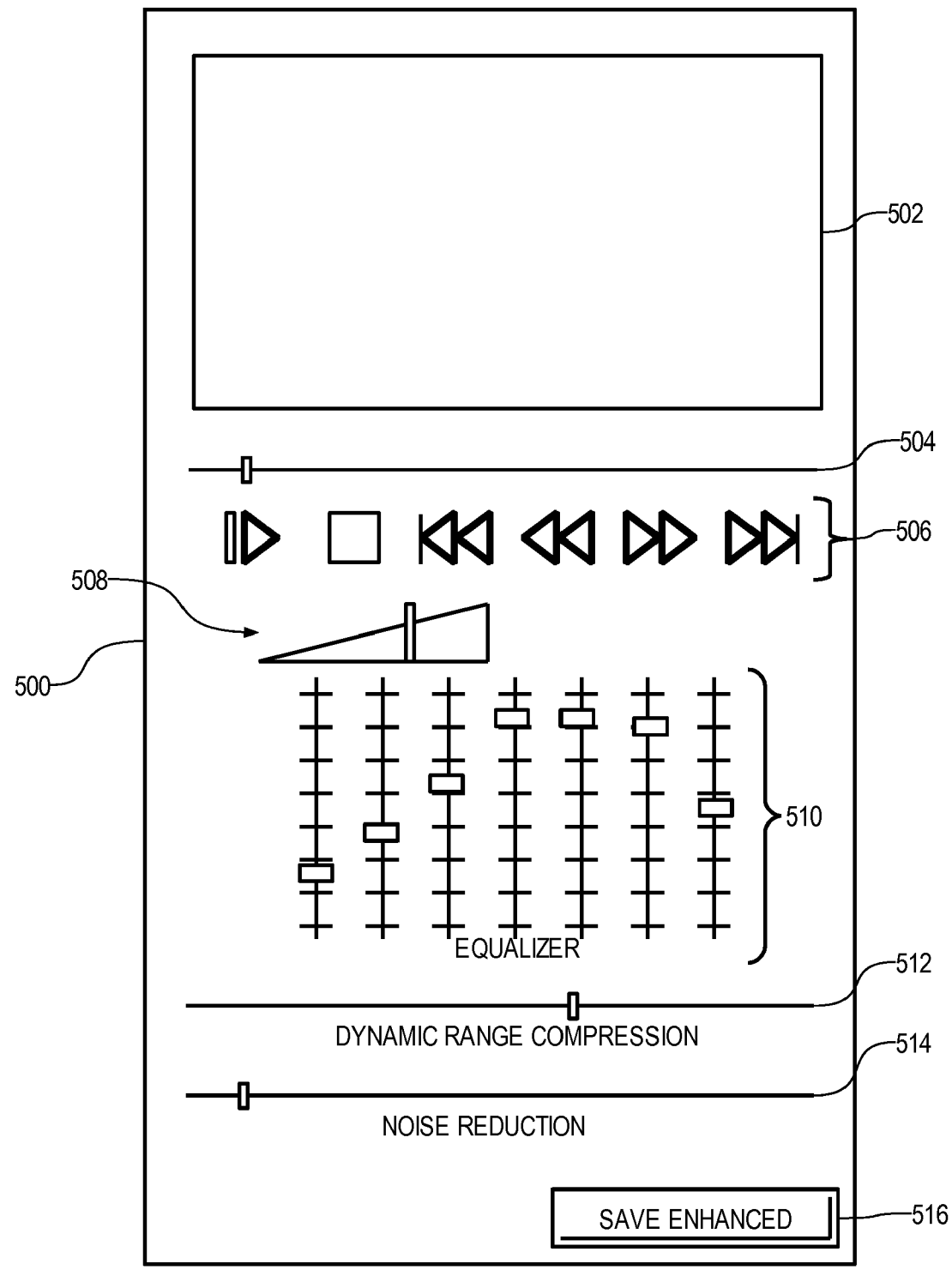
FIG. 5 shows a window that includes user interface elements for enhanced playback of non-narrative audiovisual content.

When the user actuates enhance button 122 (FIG. 1), sound module 306 (FIG. 3) of hearing application suite 220 uses audiovisual player 308 to implement an interactive audiovisual viewing experience that is represented by a window 500 (FIG. 5). Window 500 is displayed in a window manager.

Within window 500, sound module 306 (FIG. 3) causes audiovisual player 308 to play audiovisual content for display in a playback window 502. The audiovisual content can be selected by the user from audiovisual content 230 (FIG. 2) or from content available through a computer network using conventional file browsing techniques. The particular audiovisual content played in playback window 502 is sometimes referred to as the subject audiovisual content.

Window 500 includes a playback window 502, a slider 504, controls 506, a slider 508, an equalizer interface 510, a slider 512, a slider 514, and a button 516 that are directly analogous to playback window 402 (FIG. 4), slider 406, controls 408, slider 410, equalizer interface 414, slider 418, slider 420, and button 422, respectively. When invoked by sound module 306 (FIG. 3), audiovisual player 308 excludes user interface elements of window 400 (FIG. 4) that are more germane to processing of human speech—namely, caption window 404, repeat button 412, and slider 416. In addition, user data 228 can include different hearing profiles for speech and for other sounds such that equalizer interface 510 (FIG. 5) is preset according to an "other sounds" hearing profile of the user represented in user data 228.

Setting profiles saved by actuation of button 516 by the user are stored distinct from the similar setting profiles saved via button 422 (FIG. 4) in this illustrative embodiment. Thus, the user can store setting profiles for specific types of listening distinct from setting profiles for listening to human speech.

Figure 6:
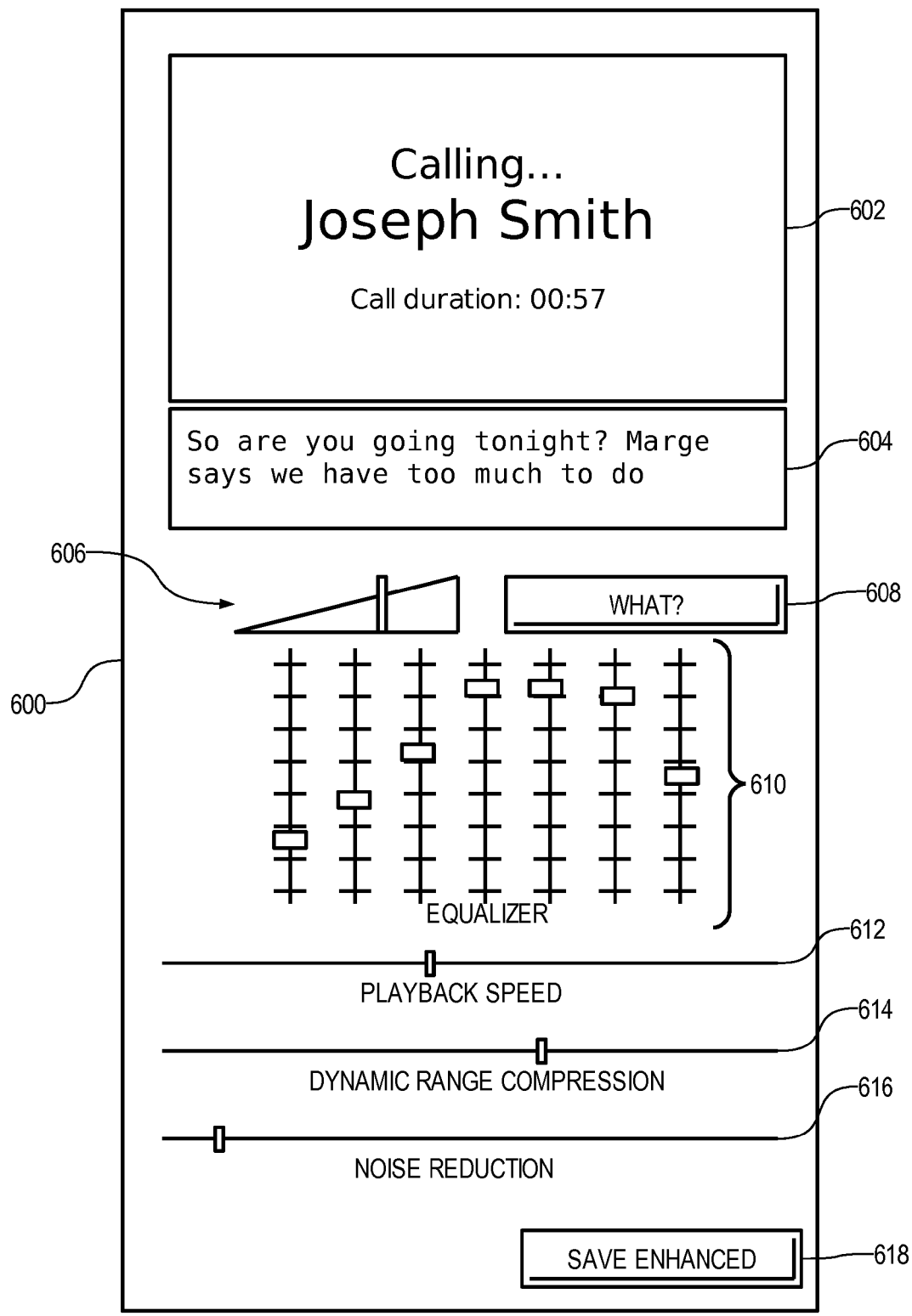
FIG. 6 shows a window that includes user interface elements for enhanced telephone communications.

When the user actuates enhance button 132 (FIG. 1), telephone module 302 (FIG. 3) of hearing application suite 220 uses audiovisual player 308 to implement an interactive voice communications experience that is represented by a window 600 (FIG. 6). Window 600 is displayed in a window manager.

Within window 600, telephone module 302 (FIG. 3) causes audiovisual player 308 to play audio content received as a stream in a telephone conversation conducted through a computer network—e.g., as a Voice over Internet Protocol (VoIP) call. In an alternative embodiment, telephone module 302 conducts a telephone conversation through a voice communications network. For example, telephone module 302 can conduct a voice telephone call through a voice capable modem attached to computer 200. In addition, a mobile telephone can be in communication with computer 200, e.g., through a wireless bluetooth connection, such that the mobile telephone sends audio received in the telephone conversation to computer 200 and receives audio to be transmitted through the mobile telephone network, computer 200 acting as a bluetooth headset for the mobile telephone. In effect, telephone module 302 can provide the enhanced telephone communications described herein for voice communication networks as well.

Audiovisual player 308 displays information regarding status of the telephone conversation in a display window 502. The audio content received as part of the telephone conversation is played for the user through loudspeakers or other sound-reproduction equipment. The particular audio content received as part of the telephone content is sometimes referred to as the subject audiovisual content.

Window 600 includes a caption window 604, a slider 606, a repeat button 608, an equalizer interface 610, a slider 612, a slider 614, a slider 616, and a button 518 that are directly analogous to caption window 404 (FIG. 4), slider 410, equalizer interface 414, slider 416, slider 418, slider 420, and button 422, respectively. When invoked by telephone module 302 (FIG. 3), audiovisual player 308 includes user interface elements of window 400 (FIG. 4) that are germane to processing of human speech received in real-time. Other user interface elements are omitted—namely, slider 406 and controls 408. In addition, user data 228 can include hearing profiles specific to telephone communication represented in user data 228.

Caption window 604 includes caption information derived in real-time by captioning module 318 and speech/text converter 334 in the manner described above with respect to caption window 404 (FIG. 4). Extemporaneous voice communication does not include predetermined captioning information, so such captioning information is only available when derived in real-time. As used herein, "real-time" means sufficiently immediately that the interactive nature of the telephone conversation is not substantially reduced. In the context of captioning, "real-time" means that captions are generated and presented to the user sufficiently quickly that the user can read the captions and respond vocally sufficiently quickly that one or more other participants perceive the vocal response to be responsive to the captioned speech.

Repeat button 608 invokes a repeat function by say again module 312 in generally the manner described above with respect to repeat button 412. However, since communication in a telephone conversation happens in real-time, the delay in vocal response by the user during playback of the most recently played portion of the received audio content of the telephone conversation can leave the other participants of the telephone conversation bewildered. When invoked by telephone module 302, say again module 312 compensates for such delay in two ways.

The first way in which say again module 312 compensates for delay in response by the user due to the repeat function of repeat button 608 is by "catching up" with the playback of the subject audio content. During repeated playback of the most recently played portion of the subject audio, say again module 312 caches additional speech received through network access circuitry 210 for playback to the user subsequent to the repeat function. Subsequent to repetition of the most recently played portion of the subject audio content, say again module 312 uses time compressor/decompressor 332 to accelerate playback of the cached portion of the subject audio content, continuing to cache additional audio content, until the accelerated playback exhausts the cached audio content. Once the cached audio content is exhausted, by playing it to the user faster than new audio content is cached, say again module 312 has "caught up" with current conversation.

The second way in which say again module 312 compensates for delay in response by the user due to the repeat function of repeat button 608 is by responding on behalf of the user. Audiovisual player 308, in carrying out telephone communication, sends voice signals generated by the user by use of a microphone, for example, out through network access circuitry 210 to one or more computers participating in the telephone conversation. During a pause by the user exceeding a predetermined period of time, e.g., 3 seconds, or during playback of most recently played audio content and accumulation of cached audio content beyond a predetermined limit, e.g., 3 seconds of audio content, say again module 312 causes audiovisual player 308 to issue a predetermined voice message to the other participant(s) informing the participant(s) of the delay. For example, during repetition of the most recently played audio content to the user, say again module 312 can play the following voice message to the one or more other participants: "Please wait for a response."

There are other circumstances in which playing of such a wait message can be advantageous. For example, captioning module 318 can determine that real-time generation of captions for display in caption window 604 has fallen behind the received audio content by a predetermined maximum limit, e.g., three (3) seconds. Captioning module 318 informs audiovisual player 308 of such a condition, upon which audiovisual player 308 can immediately issue a wait message or can match a delay in response by the user to such a condition to issue the wait message. Similarly, slowed playing of the subject audio content of the telephone conversation by use of slider 416 by the user can cause cached audio content to accumulate in a manner described above with respect to say again module 312. Audiovisual player 308 can issue the wait message when the cache accumulates to exceed a predetermined limit.

In some embodiments, audiovisual player 308 issues the wait message some predetermined maximum number of times during any given telephone conversation before disabling the wait message for the remainder of the telephone conversation. Window 600 can also include a user interface element such that the user can manually disable the wait message—either after being played a number of times or before any wait message is issued.

Setting profiles saved by actuation of button 618 by the user are stored distinct from the similar setting profiles saved via buttons 422 (FIG. 6) and 516 (FIG. 5) in this illustrative embodiment. Thus, the user can store setting profiles for specific types of telephone communication.

Thus, the world of telephone communications through Internet connections is now open to hearing-impaired people. It should be appreciated that, to the extent input/output devices 208 are capable of digital signal processing, some or all of the digital signal processing represented by user control of user interface elements of window 600 can be carried out by such input/output devices 208. For example, some headsets, particularly those implementing bluetooth wireless communications, include some digital signal processing capability. To implement some parts of the digital signal processing required by telephone module 302, telephone module 302 sends instructions to the headset to configure the digital signal processing logic within the headset to carry out the portions of digital signal processing assigned to the headset by telephone module 302.

Some of the functionality of telephone module 302 can be used in other telephone equipment. For example, many mobile telephones are capable of digital communication with a computer, e.g., either through a wired connection to an input/output port of the computer such as a USB or serial port or through a wireless connection such as a bluetooth connection. In addition, the general architecture of a mobile telephone is the same as an ordinary computer (see computer 200 in FIG. 2), albeit with limited storage capacity and limited processing resources. Mobile telephones also typically include digital signal processing logic. In this illustrative embodiment, telephone module 302 is capable of sending audiometry data from user data 228 through input/output devices 208 to a mobile telephone such that the digital signal processing logic within the mobile telephone subsequently conditions received audio signals according to the specifically assessed hearing abilities of the user. In addition, telephone module 302 can send setting profiles that are stored in user data 228 and are associated with telephone communications such that the mobile telephone can be customized by the user through the user interface elements of window 600 (FIG. 6). To the extent landline telephone equipment is capable of communication with computer 200 and includes digital signal processing logic, telephone module 302 (FIG. 3) can also send audiometry and/or setting profiles for telephone communications to the landline telephone equipment for customized adaptation to the specific hearing capabilities of the user in an analogous manner.

In addition, to the extent telephone peripheral devices are capable of digital signal processing, some or all of the digital signal processing asked of a mobile telephone can be carried out by such telephone peripheral devices. For example, to implement some parts of the digital signal processing required by the mobile telephone, the mobile telephone sends instructions to the headset to configure the digital signal processing logic within the headset to carry out the portions of digital signal processing assigned to the headset by the mobile telephone.

Similarly, telephone module 302 can communicate such audiometry data to analogy telephone adapter (ATA) equipment by which the user can conduct VoIP telephone conversations using conventional analog telephone equipment. Such ATA equipment is typically connected to a local area network and is therefore reachable by telephone module 302 through network access circuitry 210.

As described above, hearing application suite 220 provides aural training for audio and/or video narration 102, for other sounds 104, and for telephone communications 106. Hearing application suite 220 includes a training module 310 to implement such aural training.

The aural training for audio and/or video narration 102 represented by button 114 is described in the '820 Application and that description is incorporated herein by reference. The aural training for telephone communications 106 represented by button 134 is directly analogous except that equalizer 322 simulates the frequency spectrum typically produced by telephone equipment and noise added by synthesizer 324 and mixer 328 simulates the types of noise produced by telephone networks and equipment. Examples of such noise includes mobile telephone channel errors, dropouts, decompression errors, and echoes, for example.

The aural training for other sounds 104 represented by button 124 involves the same varying of sound quality and testing the user's ability to perceive elements of the sound that is described in the '820 Application. However, some of the noise that is varied and some of the elements that are to be perceived by the user are selected for training specific to listening to music.

For example, to train the user in the perception of vocalized lyrics in music, training module 310 uses mixer 326 to vary the ratio of lyrics gain to music gain—making the lyric easier or more difficult to perceive when mixed with the accompanying music. To facilitate this sort of training, audiovisual content 230 includes music and accompanying lyrics stored separately, e.g., as separate data files or as separate channels in a single digitized audio signal. In addition, training module 310 can use digital signal processing techniques to parse audio data representing vocalized lyrics and audio data representing accompany music from the audio data representing both combined.

Training module 310 in conjunction with sound module 306 also tests the user's ability to discriminate from among a number of different types of musical instruments. In particular, rather than playing speech with varying degrees of degradation and testing the user's ability to understand the speech, training module 310 plays recorded music of any of a number of instruments in varying degrees of degradation and asks the user to identify the type of instrument. For this purpose, audiovisual content 230 includes prerecorded audio content of various types of instruments playing various music pieces. Training module 310 degrades the music by creating noise with synthesizer 324 and mixing in the noise at various ratios to signal with mixer 328 and/or by compression/expansion of the dynamic range with dynamic engine 330. Synthesizer 324 can generate various types of random noise such as white noise, pink noise, brown noise, blue noise, purple noise, and/or grey noise. In addition, synthesizer 324 can generate noise that emulates errors found in digitized or otherwise recorded or transmitted sound.

Sound module 306 can also use training module 310 to train the user in recognition of melodic patterns. Training module 310 plays a repeating melody and then prompts the user to select a continuation of the melody from among several choices. In testing the recognition of melodic patterns, training module 310 can vary the complexity of the melody, the cycle of the melody (i.e., the duration of each repetition of the melody), and the cadence of the melody. Training module 310 can vary the cadence of the melody by using time compressor/decompressor 332.

Sound module 306 and training module 310 can also train the user's musical memory and recognition of pitch and interval. Training module 310 plays a portion of a presumably recognizable piece of music such as a popular song and prompts the user to identify the musical piece from a number of selections. The difficulty can be varied by training module 310 by selecting briefer portions of the musical piece and by speeding up the portions using time compressor/decompressor 332 and by adding noise using synthesizer 324 and mixer 328.

Thus, hearing application suite 220 brings the world of digital information in all its multimedia forms to people with hearing impairments.

The above description is illustrative only and is not limiting. Instead, the present invention is defined solely by the claims which follow and their full range of equivalents.

What is claimed is:

1. A computer-implemented method comprising:
   presenting a user interface by which a user can select from enhanced narration, narration hearing training, enhanced voice communication, voice communication hearing training, enhanced non-narrative listening, and non-narrative hearing training;
   upon selection of enhanced narration by the user, presenting audiovisual content to the user and enhancing speech within the audiovisual content for improved hearing by the user;
   upon selection of narration hearing training by the user, presenting interactive aural training exercises to the user to improve the user's ability to hear and understand speech;
   upon selection of enhanced voice communication by the user, carrying out interactive voice communication between the user and another person and enhancing speech received from the other person through the interactive voice communication for improved hearing by the user;
   upon selection of voice communication hearing training by the user, presenting interactive aural training exercises to the user to improve the user's ability to hear and understand interactive voice communication speech;
   upon selection of enhanced non-narrative listening by the user, presenting audiovisual content to the user and enhancing sound within the audiovisual content for improved hearing by the user; and
   upon selection of non-narrative hearing training by the user, presenting interactive aural training exercises to the user to improve the user's ability to hear and perceive sound accurately.

2. The method of claim 1 wherein enhancing speech, enhancing speech received from the other person through the interactive voice communication, and enhancing sound each comprise:
   modifying sound in accordance with audiometric data representing subjective hearing abilities of the user.

3. The method of claim 1 wherein enhancing speech and enhancing speech received from the other person through the interactive voice communication each comprise:
   displaying caption data textually representing the substantive content of speech.

4. The method of claim 3 wherein enhancing speech and enhancing speech received from the other person through the interactive voice communication each further comprise:
   deriving the caption data by application of artificial speech recognition to audio data representing the speech.

5. The method of claim 1 wherein enhancing speech, enhancing speech received from the other person through the interactive voice communication, and enhancing sound each comprise:
   modifying sound in accordance with subjective hearing preferences of the user.

6. The method of claim 5 wherein the subjective hearing preferences of the user include a rate of playback.

7. The method of claim 5 wherein the subjective hearing preferences of the user include an amount of dynamic range compression/expansion.

8. The method of claim 5 wherein the subjective hearing preferences of the user include an amount of noise reduction.

9. The method of claim 3 further comprising:
   saving one or more setting profiles wherein each of the setting profiles represents a collection of one or more subjective hearing preferences of the user.

* * * * *